T. L. BEGUHN.
DIFFERENTIAL DRIVING MECHANISM.
APPLICATION FILED APR. 27, 1911.

1,071,863.

Patented Sept. 2, 1913.

2 SHEETS—SHEET 1.

T. L. BEGUHN.
DIFFERENTIAL DRIVING MECHANISM.
APPLICATION FILED APR. 27, 1911.
1,071,863.
Patented Sept. 2, 1913.
2 SHEETS—SHEET 2.
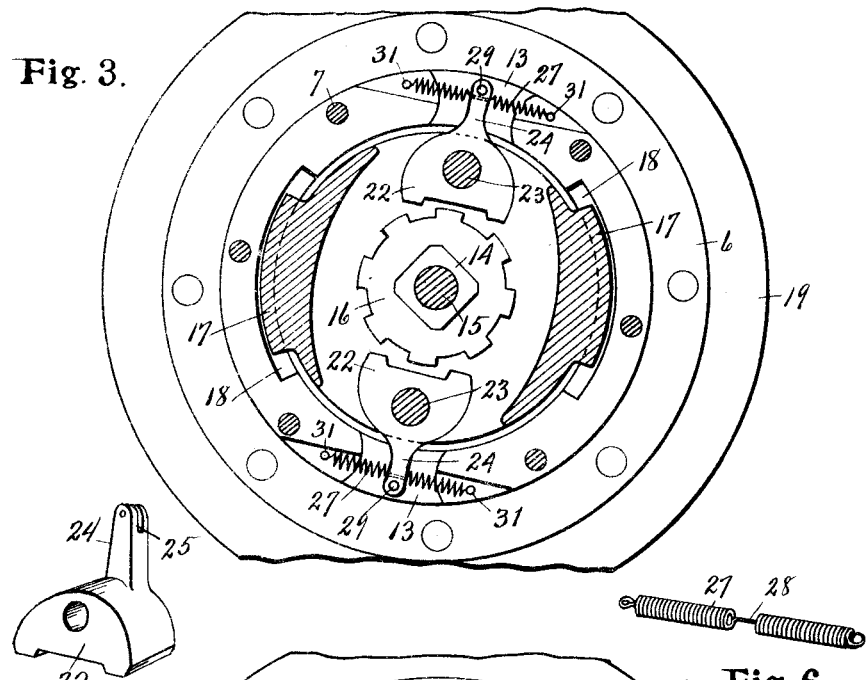
Fig. 3.
Fig. 5.
Fig. 6.
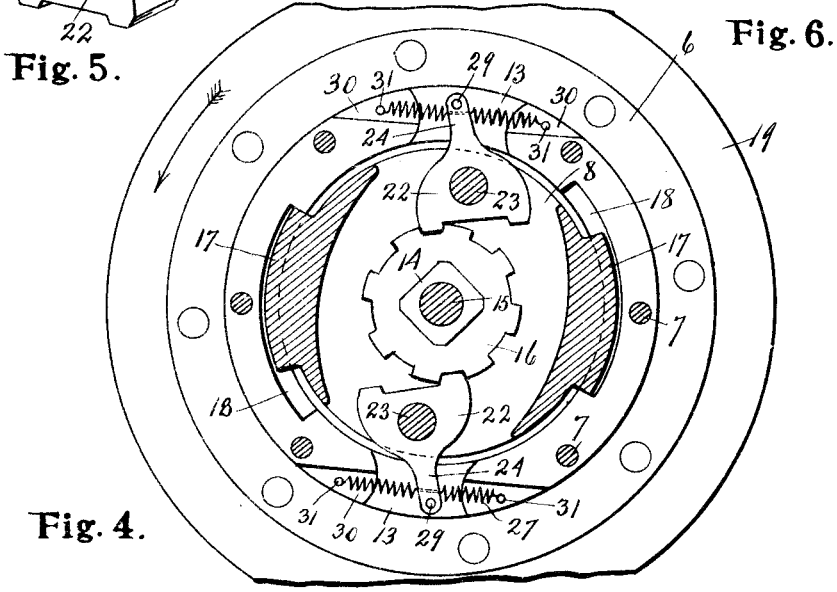
Fig. 4.
Witnesses
O. B. Banziger
J. G. Howlett
Inventor
Theodore L. Beguhn
E. A. Wheeler, Attorney

UNITED STATES PATENT OFFICE.

THEODORE L. BEGUHN, OF DETROIT, MICHIGAN.

DIFFERENTIAL DRIVING MECHANISM.

1,071,863.  Specification of Letters Patent.  Patented Sept. 2, 1913.

Application filed April 27, 1911. Serial No. 623,729.

*To all whom it may concern:*

Be it known that I, THEODORE L. BEGUHN, a citizen of the United States, residing at Detroit, in the county of Wayne, State of Michigan, have invented certain new and useful Improvements in Differential Driving Mechanism; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to differential driving mechanism especially designed for use in the propulsion of motor vehicles, and consists in the construction and arrangement of parts hereinafter more fully set forth and pointed out particularly in the claim.

The object of the invention is to provide simple and efficient means through the operation of which both traction wheels of an automobile or motor vehicle may be positively driven, the arrangement being such as to allow either wheel to coast or overrun the driving member; provision being made for returning the parts to the neutral position from either the forward or backward driving position when the motion of the driving shaft is stopped.

The above object is accomplished by the mechanism illustrated in the accompanying drawings, in which:—

Figure 1:
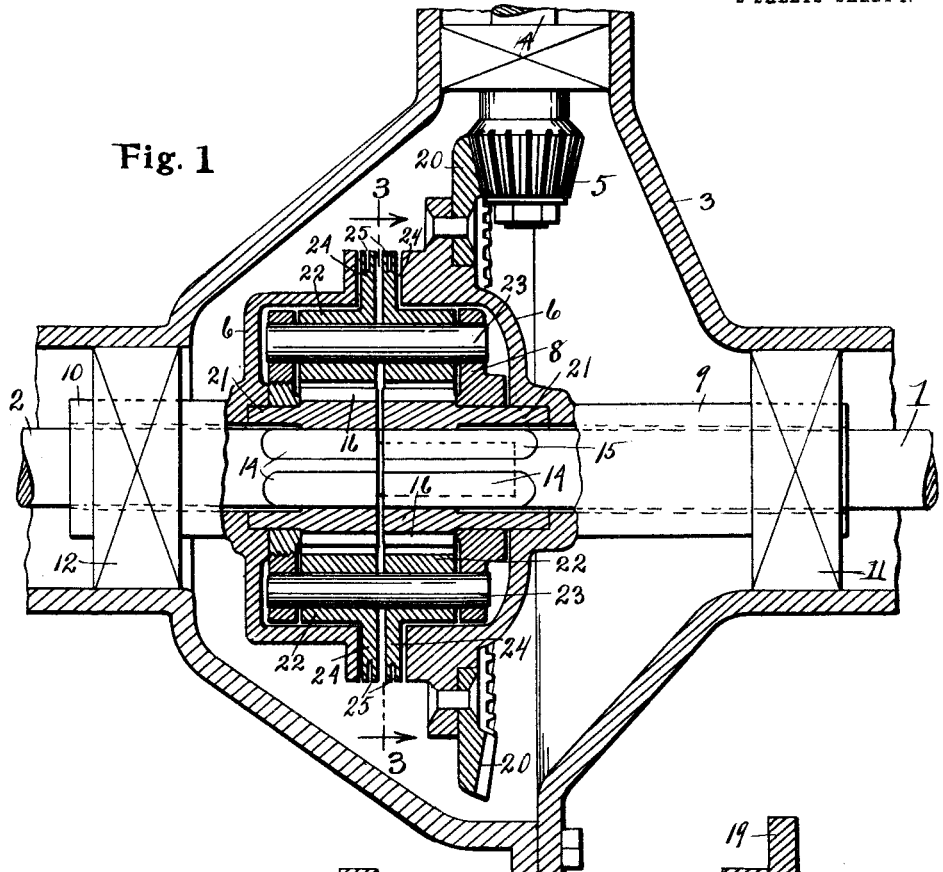
Figure 2:
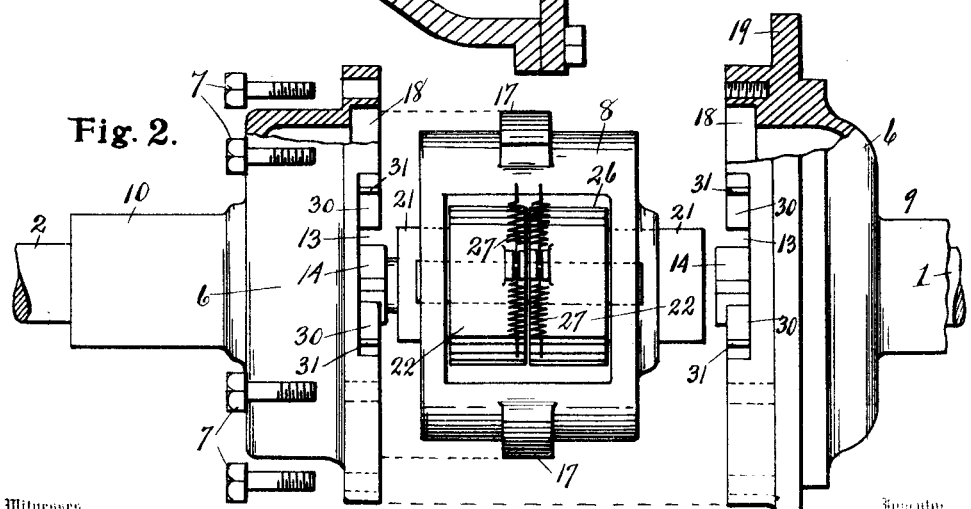

Figure 1 is an enlarged sectional view through the differential housing which embraces the ends of the divided axle, and through the differential driving mechanism located therein, the ends of the shaft sections appearing in elevation. Fig. 2 is a segregated view partly in section of the differential driving mechanism. Fig. 3 is a fragmentary view in section, as on line 3—3 of Fig. 1, showing the initial or neutral position of the parts. Fig. 4 is a similar view showing the position of parts when driving ahead. Fig. 5 is a perspective view of one of the locking pawls. Fig. 6 is a perspective view of one of the springs employed to return the pawls to a neutral position.

Referring to the characters of reference, 1 and 2 designate the axle sections respectively, on which are mounted the traction wheels, not shown. Embracing the differential mechanism is a housing 3 into which extends the driving shaft 4 carrying a beveled pinion 5. Loosely mounted over the terminals of the axle sections is a two-part case 6 the sides of which are bolted together through the medium of the screw bolts 7, clearly shown in Fig. 2. This case is of sufficient size to freely embrace the cage 8 and the parts of said case are provided with extending sleeves 9 and 10, respectively, which are journaled in the bearings 11 and 12. Formed in the meeting edges of the parts of the case 6 on opposite sides are registering recesses 13 for purposes hereinafter explained. The inner ends of the axle sections 1 and 2 are squared, as shown at 14, and are held in axial alinement by a reduced extension 15 projecting from the end of shaft section 2 and entering a corresponding socket in the end of section 1, as shown by dotted lines in Fig. 1. By this means the ends of the shaft sections are held in axial alinement and are permitted to rotate independently. The cage 8 which is located within the case 6 receives the squared ends of the shaft sections, and mounted upon the squared end of each of said shaft sections within said cage is a ratchet 16. Projecting from the periphery of the cage 8 on opposite sides are the lugs 17 which lie freely in the diametrically opposed recesses 18 in the wall of the case 6. It will be noted on referring to Figs. 3 and 4 that the length of said recesses is greater than the length of said lugs, thereby allowing a limited independent movement between the cage and case. To the annular flange 19 of the case 6 is secured a gear ring 20 which meshes with the pinion 5 and through the medium of which the case 6 is rotated by the turning of the shaft 4. The hubs 21 of the ratchets extend through the sides of the cage 8 and serve as journal bearings for the cage, the terminals of said hubs projecting into recesses or sockets in the sides of the case 6 around the shaft openings therethrough. By this arrangement a longitudinal shifting of the case 6 is prevented, while the shaft sections are permitted to turn freely within the case and cage.

Within the cage 8 are two opposed sets of double acting pawls 22 which are pivotally mounted upon the transverse pins 23 supported at their terminals in the sides of said cage. Projecting from each of said pawls is an arm 24 having a slot 25 in the end thereof. The periphery of the cage 8 at the point of location of said pawls is cut away to form an opening 26 therein, (see Fig. 2.) The projecting arms 24 of the pawls extend into the slotted openings 13 in the case 6. For the purpose of maintaining the arms 24 of the pawls centrally within the openings 13 of the case, there are employed the coiled springs 27 having straight central portions 28 which lie in the slots 25 in the ends of said arms, and which are confined therein by the transverse pins 29, as shown in Figs. 3 and 4. The end of the springs 27 are secured in the recesses 30 between the meeting faces of the sides of the case 6 which communicate with the slotted openings 13 by means of the laterally projecting pins 31 set in said recesses and engaging the terminals of said springs. The tension of the springs 27 is normally exerted to maintain the arms 24 of the pawls centrally of the openings 13 and hold said pawls in the neutral position when the parts are at rest, as shown in Fig. 3, in which position the ratchets 16 on the ends of the shaft sections are free to revolve in either direction.

In the operation of this device, the initial rotation of the case 6 in the direction of the arrow shown in Fig. 4 through the medium of the pinion 5 and gear ring 20 will cause said case to have a slight rotary movement about the cage 8 which at the start remains at rest. This initial movement of the case will draw upon the arms 24 of the pawls through the medium of the springs 27 and swing said pawls upon their pivots 23 in a manner to cause them to engage the ratchets 16. The parts have such operative relation that immediately following the actuation of the pawls which effects their engagement with the ratchets 16, the terminal of the recesses 18 in the case will engage the lugs 17 on the cage and effect a driving connection between the cage and case, which driving connection is transmitted through the pawls of the cage and the ratchets 16 to the shaft sections, thereby causing the shaft sections to turn with the case at the same rate of speed and effecting a positive drive for each of the traction wheels. While this arrangement affords a positive drive for the shaft sections, it also allows either shaft section to run ahead faster than its driving member to permit the outside wheel to turn faster than the wheel on the inside when turning a corner or when rounding a curve. The arrangement also allows either shaft section to turn faster than the driving member when coasting. In these cases the ratchets will turn faster than the cage is rotating, and the teeth thereof will slip past the teeth of the pawls. When reversing the direction of rotation of the driving shaft 4, the same operation takes place in the reverse direction, enabling the vehicle to be driven backwardly, the spring connection between the case and the pawls of the cage actuating said pawls on their pivots at each change in the direction of rotation of the case to effect the necessary driving connection between the cage and the shaft sections in advance of the driving connection which is effected between the cage and case through the medium of the recesses in the former which receive the lugs on the latter. With the parts in the neutral position, as shown in Fig. 1, either of the traction wheels may be revolved freely in either direction independently of the other.

Having thus fully set forth my invention, what I claim as new and desire to secure by Letters Patent, is:—

A differential mechanism comprising a divided shaft, a ratchet fixed on the end of each shaft section, a cage rotatable independently of the shaft sections embracing said ratchet, pawls pivoted in said cage adapted to effect a driving engagement with said ratchets but normally free from engagement therewith, a rotary driving case embracing said cage, said case having a recess in the inner wall thereof, an arm projecting from each of said pawls extending into said recess, a spring connected at its center to the end of each arm and having its ends fastened to said case, whereby the initial movement of said case in either direction will actuate said pawls upon their pivots, the wall of the case having curved recesses therein, and lugs upon said cage lying freely within said recesses to effect a driving connection between the cage and the case and to allow an independent movement of the latter.

In testimony whereof, I sign this specification in the presence of two witnesses.

THEODORE L. BEGUHN.

Witnesses:
O. B. BAENZIGER,
I. G. HOWLETT.